(12) United States Patent
Wang et al.

(10) Patent No.: US 9,407,155 B2
(45) Date of Patent: Aug. 2, 2016

(54) ISOLATED SWITCHING CONVERTER WITH SECONDARY SIDE MODULATION AND CONTROL METHOD

(71) Applicant: Chengdu Monolithic Power Systems Co., Ltd., Chengdu (CN)

(72) Inventors: Siran Wang, Hangzhou (CN); Eric Yang, Saratoga, CA (US); John Wiggenhorn, Cary, NC (US); Qiming Zhao, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 14/512,251

(22) Filed: Oct. 10, 2014

(65) Prior Publication Data

US 2015/0103567 A1 Apr. 16, 2015

(30) Foreign Application Priority Data

Oct. 12, 2013 (CN) .......................... 2013 1 0475919

(51) Int. Cl.
*H02M 3/335* (2006.01)
(52) U.S. Cl.
CPC ........ *H02M 3/33592* (2013.01); *Y02B 70/1475* (2013.01)
(58) Field of Classification Search
CPC .......... H02M 3/1588; H02M 3/33576; H02M 3/33592; Y02B 70/126; Y02B 70/1475
See application file for complete search history.

(56) References Cited

U.S. PATENT DOCUMENTS

| | | | | |
|---|---|---|---|---|
| 5,771,165 | A * | 6/1998 | Couture et al. | 363/97 |
| 5,991,172 | A * | 11/1999 | Jovanovic et al. | 363/21.14 |
| 7,113,413 | B1 * | 9/2006 | Khasiev | 363/21.14 |
| 8,063,588 | B1 * | 11/2011 | Ribarich et al. | 315/360 |
| 2005/0179425 | A1 * | 8/2005 | Umemoto et al. | 323/284 |
| 2006/0125450 | A1 * | 6/2006 | Tabaian et al. | 323/222 |
| 2007/0014133 | A1 * | 1/2007 | Shao et al. | 363/52 |
| 2010/0110738 | A1 * | 5/2010 | Shimizu | 363/124 |
| 2013/0300384 | A1 | 11/2013 | Wang et al. | |
| 2013/0301310 | A1 | 11/2013 | Wang et al. | |
| 2013/0301311 | A1 | 11/2013 | Wang et al. | |

\* cited by examiner

*Primary Examiner* — Timothy J Dole
*Assistant Examiner* — Monica Mata
(74) *Attorney, Agent, or Firm* — Perkins Coie LLP

(57) ABSTRACT

A controller of an isolated switching converter includes an error amplifying circuit, a modulation signal generator, a first comparison circuit, a primary off detection circuit, a secondary logic circuit, an isolation circuit and a primary logic circuit. The error amplifying circuit generates a compensation signal based on the difference between a reference signal and a feedback signal. The first comparison circuit compares the compensation signal with a modulation signal generated by the modulation signal generator and generates a first comparison signal. The primary off detection circuit detects whether the primary switch is off and generates a primary off detection signal. The secondary logic circuit generates a secondary control signal to control the secondary switch based on the first comparison signal and the primary off detection signal. The isolation circuit receives the first comparison signal and generates a synchronous signal electrically isolated from the first comparison signal. The primary logic circuit generates a primary control signal to control the primary switch based on the synchronous signal.

18 Claims, 11 Drawing Sheets

ISOLATED SWITCHING CONVERTER WITH SECONDARY SIDE MODULATION AND CONTROL METHOD

CROSS-REFERENCE TO RELATED APPLICATION(S)

This application claims the benefit of CN application 201310475919.1 filed on Oct. 12, 2013, and incorporated herein by reference.

TECHNICAL FIELD

The present invention generally relates to electronic circuits, and more particularly but not exclusively to isolated switching converters and control methods thereof.

BACKGROUND

Synchronous rectification is a technology for improving efficiency by replacing a rectifying diode with a power metal oxide semiconductor field-effect transistor (MOSFET). MOSFET is a voltage controlled device which has a linear voltage-current characteristic when turned ON. So the gate voltage of the power MOSFET used as a synchronous rectifier needs to be in phase with the rectified voltage.

FIG. 1 illustrates waveforms of a smart synchronous rectification, wherein Vds indicates the drain-source voltage of a secondary switch (the synchronous rectifier), Isec indicates the current flowing through a secondary winding, CTRLS indicates the control signal of the secondary switch. The drain-source voltage Vds is compared with two threshold voltage, such as −70 mV and −500 mV. When a body diode of the secondary switch is turned on, the drain-source voltage Vds drops rapidly. The secondary switch is turned on when the drain-source voltage Vds drops below −500 mV. When a primary switch is turned on, the drain-source voltage Vds rises rapidly. The secondary switch is turned off when the drain-source voltage Vds rises up to −70 mV.

The smart synchronous rectification shown in FIG. 1 turns off the secondary switch after the primary switch is on. This may induce shoot through between the primary switch and the secondary switch. Furthermore, because of the characteristic of the secondary switch and delay of the control circuit, there may exist delay to turn off the secondary switch after the drain-source voltage Vds rises to reach −70 mV, which obviously worsen the case.

SUMMARY

Embodiments of the present invention are directed to a controller used in an isolated switching converter, wherein the isolated switching converter comprises a transformer having a primary winding and a secondary winding, a primary switch coupled to the primary winding and a secondary switch coupled to the secondary winding, the controller comprises: an error amplifying circuit configured to receive a reference signal and a feedback signal indicative of an output signal of the isolated switching converter, wherein based on the difference between the reference signal and the feedback signal, the error amplifying circuit generates a compensation signal; a modulation signal generator configured to generate a modulation signal; a first comparison circuit coupled to the error amplifying circuit and the modulation signal generator, wherein the first comparison circuit compares the compensation signal with the modulation signal and generates a first comparison signal; a primary off detection circuit configured to detect whether the primary switch is off and generate a primary off detection signal; a secondary logic circuit coupled to the first comparison circuit and the primary off detection circuit, wherein based on the first comparison signal and the primary off detection signal, the secondary logic circuit generates a secondary control signal to control the secondary switch; an isolation circuit coupled to the first comparison circuit to receive the first comparison signal, wherein based on the first comparison signal, the isolation circuit generates a synchronous signal electrically isolated from the first comparison signal; and a primary logic circuit coupled to the isolation circuit to receive the synchronous signal, wherein based on the synchronous signal, the primary logic circuit generates a primary control signal to control the primary switch.

Embodiments of the present invention are also directed to an isolated switching converter, comprising: a transformer having a primary winding and a secondary winding, wherein the secondary winding is coupled to provide an output signal to a load; a primary switch coupled between the primary winding and a primary reference ground; a secondary switch coupled between the secondary winding and the load; an error amplifying circuit configured to receive a reference signal and a feedback signal indicative of the output signal, wherein based on the difference between the reference signal ad the feedback signal, the error amplifying circuit generates a compensation signal; a modulation signal generator configured to generate a modulation signal; a first comparison circuit coupled to the error amplifying circuit and the modulation signal generator, wherein the first comparison circuit compares the compensation signal with the modulation signal and generates a first comparison signal; a primary off detection circuit configured to detect whether the primary switch is off and generate a primary off detection signal; a zero cross detection circuit configured to detect whether the current flowing the secondary switch crosses zero and generate a zero cross detection signal; a secondary logic circuit coupled to the first comparison circuit, the primary off detection circuit and the zero cross detection circuit, wherein based on the first comparison signal, the primary off detection signal and the zero cross detection signal, the secondary logic circuit generates a secondary control signal to control the secondary switch; an isolation circuit coupled to the first comparison circuit to receive the first comparison signal, wherein based on the first comparison signal, the isolation circuit generates a synchronous signal electrically isolated from the first comparison signal; a threshold generator coupled to the isolation circuit to receive the synchronous signal, wherein based on the synchronous signal, the threshold generator generates a first threshold voltage; a second comparison circuit coupled to the threshold generator, wherein the second comparison circuit compares a primary current sensing signal indicative of the current flowing through the primary switch with the first threshold voltage and generates a second comparison signal; and a primary logic circuit coupled to the isolation circuit and the second comparison circuit, wherein based on the synchronous signal and the second comparison signal, the primary logic circuit generates a primary control signal to control the primary switch.

Embodiments of the present invention are further directed to a control method of an isolated switching converter, wherein the isolated switching converter comprises a transformer having a primary winding and a secondary winding, a primary switch coupled to the primary winding and a secondary switch coupled to the secondary winding, the control method comprises: sensing an output signal of the isolated switching converter and generating a feedback signal; generating a compensation signal based on the difference between the reference signal and the feedback signal; comparing the compensation signal with a modulation signal and generating a first comparison signal; detecting whether the primary switch is off and generating a primary off detection signal; generating a secondary control signal to control the secondary switch based on the first comparison signal and the primary off detection signal; generating a synchronous signal electrically isolated from the first comparison signal; and generating a primary control signal to control the primary switch based on the synchronous signal.

According to embodiments of the present invention, the secondary switch is controlled based on the first comparison signal, and the primary switch is controlled based on the synchronous signal electrically isolated from the first comparison signal. Switching between the primary switch and the secondary switch can be precisely controlled, and shoot through is avoided.

BRIEF DESCRIPTION OF THE DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

In the following descriptions, a flyback converter is used as an example to explain the working principle of the present invention. However, persons skilled in the art can recognize that it is not intended to limit the invention. The present invention may be applied to any other suitable isolated switching converters.

Figure 1:
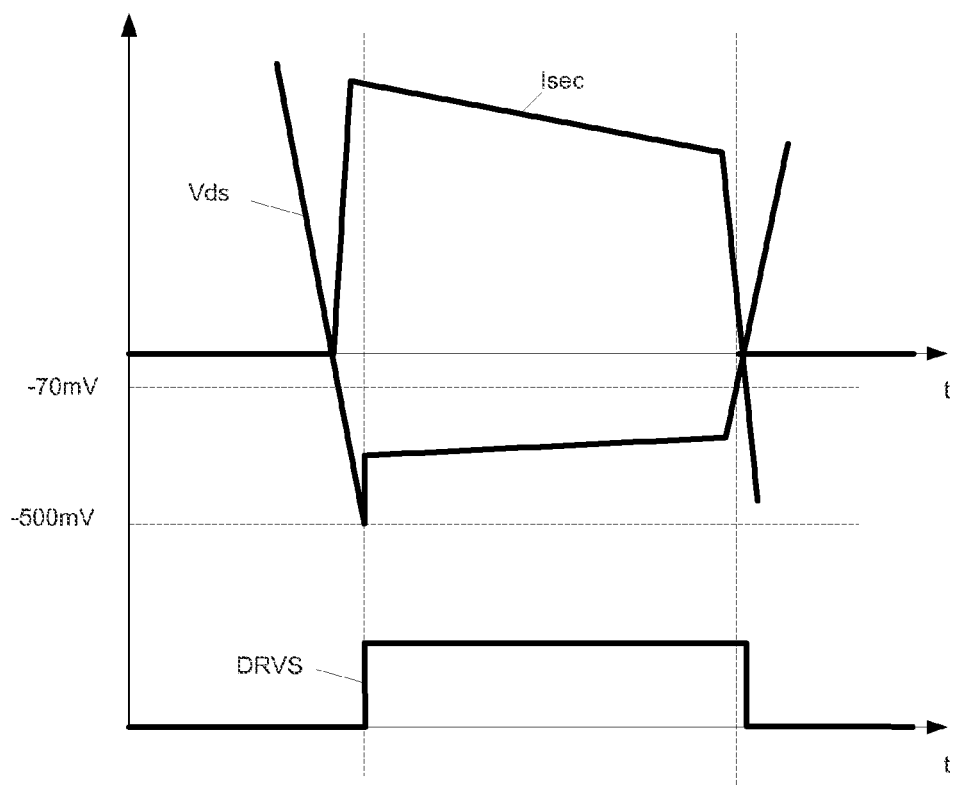
FIG. 1 illustrates waveforms of a smart synchronous rectification.
Figure 2:
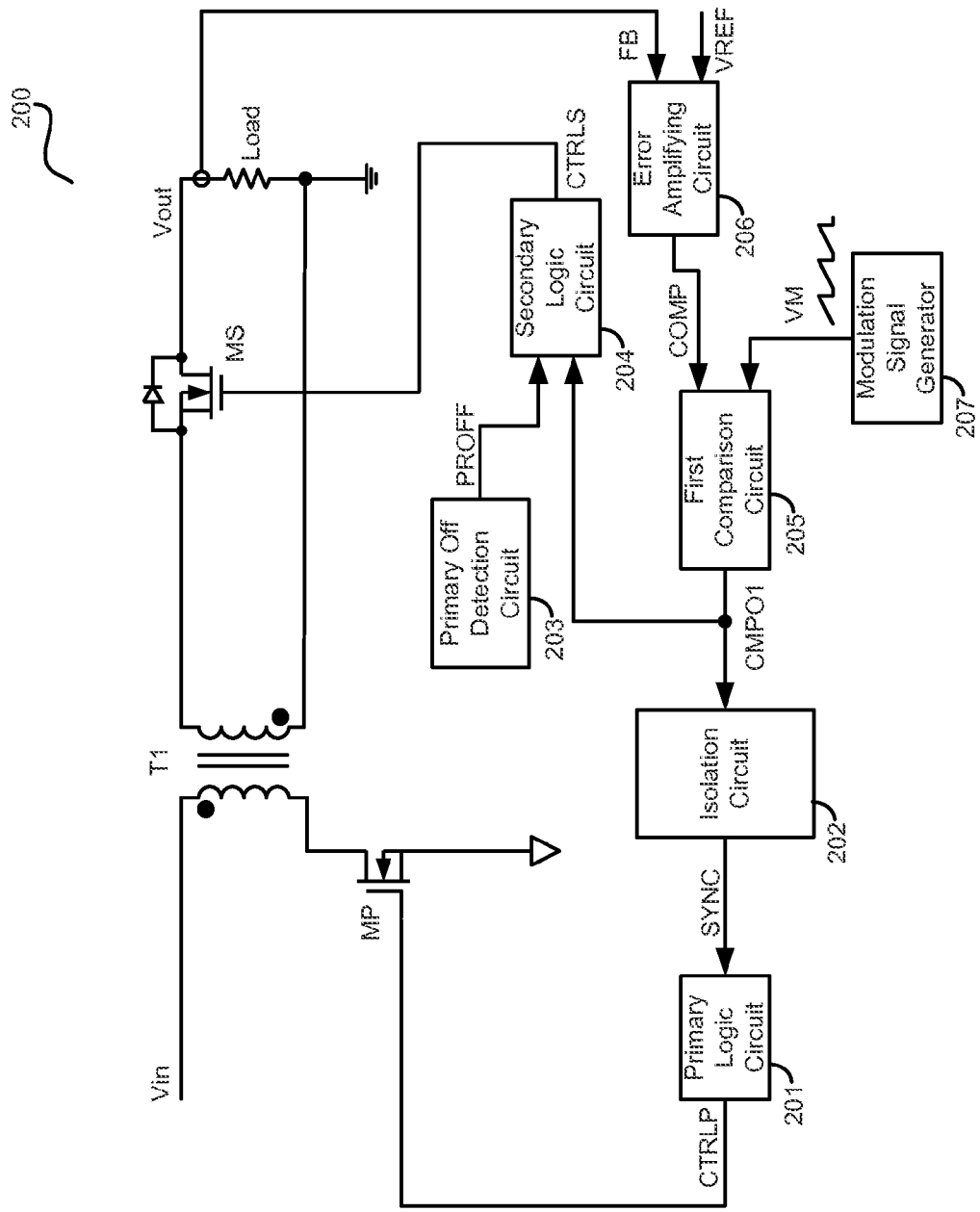
FIG. 2 illustrates a block diagram of an isolated switching converter 200 in accordance with an embodiment of the present invention.

FIG. 2 illustrates a block diagram of an isolated switching converter 200 in accordance with an embodiment of the present invention. The isolated switching converter 200 comprises a transformer T1, a primary switch MP, a secondary switch MS and a controller. The transformer T1 has a primary winding and a secondary winding with each of the windings having a first terminal and a second terminal. The first terminal of the primary winding is configured to receive an input voltage Vin, the second terminal of the secondary winding is coupled to a secondary reference ground. The primary switch MP is coupled between the second terminal of the primary winding and a primary reference ground, the secondary switch MS is coupled between the first terminal of the secondary winding and the load. Persons of ordinary skill in the art can recognize that, the secondary switch MS may also be coupled between the second terminal of the secondary winding and the load.

The controller comprises a primary logic circuit 201, an isolation circuit 202, a primary off detection circuit 203, a secondary logic circuit 204, a first comparison circuit 205, an error amplifying circuit 206 and a modulation signal generator 207. In some embodiments, the controller and the secondary switch MS are integrated in the same chip. The error amplifying circuit 206 has a first input terminal, a second input terminal and an output terminal, wherein the first input terminal is configured to receive a feedback signal FB indicative of an output signal (e.g. output voltage, output current or output power) of the isolated switching converter, the second input terminal is configured to receive a reference signal VREF. Based on the difference between the reference signal VREF and the feedback signal FB, the error amplifying circuit 206 generates a compensation signal COMP at the output terminal. The modulation signal generator 207 is configured to generate a modulation signal VM which may be saw tooth signal, triangular signal or any other suitable signals. The first comparison circuit 205 has a first input terminal, a second input terminal and an output terminal, wherein the first input terminal is coupled to the output terminal of the error amplifying circuit 206 to receive the compensation signal COMP, the second input terminal is coupled to the modulation signal generator 207 to receive the modulation signal VM. The first comparison circuit 205 compares the compensation signal COMP with the modulation signal VM and generates a first comparison signal CMPO1 at the output terminal.

The primary off detection circuit 203 is configured to detect whether the primary switch MP is off and generate a primary off detection signal PROFF. The primary off detection circuit 203 may detect whether the primary switch MP is off based on the drain-source voltage of the secondary switch MS, the current flowing though the secondary switch MS, the voltage across the secondary winding and so on. The primary off detection circuit 203 may also receive signals indicating whether the primary switch MP is off from the primary side.

The secondary logic circuit 204 has a first input terminal, a second input terminal and an output terminal, wherein the first input terminal is coupled to the primary off detection circuit 203 to receive the primary off detection signal PROFF, the second input terminal is coupled to the first comparison circuit 205 to receive the first comparison signal CMPO1. Based on the first comparison signal CMPO1 and the primary off detection signal PROFF, the secondary logic circuit 204 generates a secondary control signal CTRLS to control the secondary switch MS at the output terminal.

The isolation circuit 202 has an input terminal and an output terminal, wherein the input terminal is coupled to the output terminal of the first comparison circuit 205 to receive the first comparison signal CMPO1. Based on the first comparison signal CMPO1, the isolation circuit 202 generates a synchronous signal SYNC electrically isolated from the first comparison signal CMPO1 at the output terminal. The isolation circuit 202 may comprise opto-coupler, transformer, capacitor or other suitable electrical isolators. In some embodiments, the isolation circuit 202 may be located outside of the controller.

The primary logic circuit 201 has an input terminal and an output terminal, wherein the input terminal is coupled to the output terminal of the isolation circuit 202 to receive the synchronous signal SYNC. Based on the synchronous signal SYNC, the primary logic circuit 201 generates a primary control signal CTRLP to control the primary switch MP at the output terminal.

The isolated switching converter 200 shown in FIG. 2 utilizes a secondary side regulation. The secondary switch MS is controlled based on the first comparison signal CMPO1, and the primary switch MP is controlled based on the synchronous signal electrically isolated from the first comparison signal CMPO1. Switching between the primary switch MP and the secondary switch MS can be precisely controlled, and shoot through is avoided.

In some embodiments, to ensure the primary switch MP is turned on after the secondary switch is off, a delay circuit is coupled between the first comparison circuit 205 and the isolation circuit 202, or coupled between the isolation circuit 202 an the primary logic circuit 201.

Figure 3:
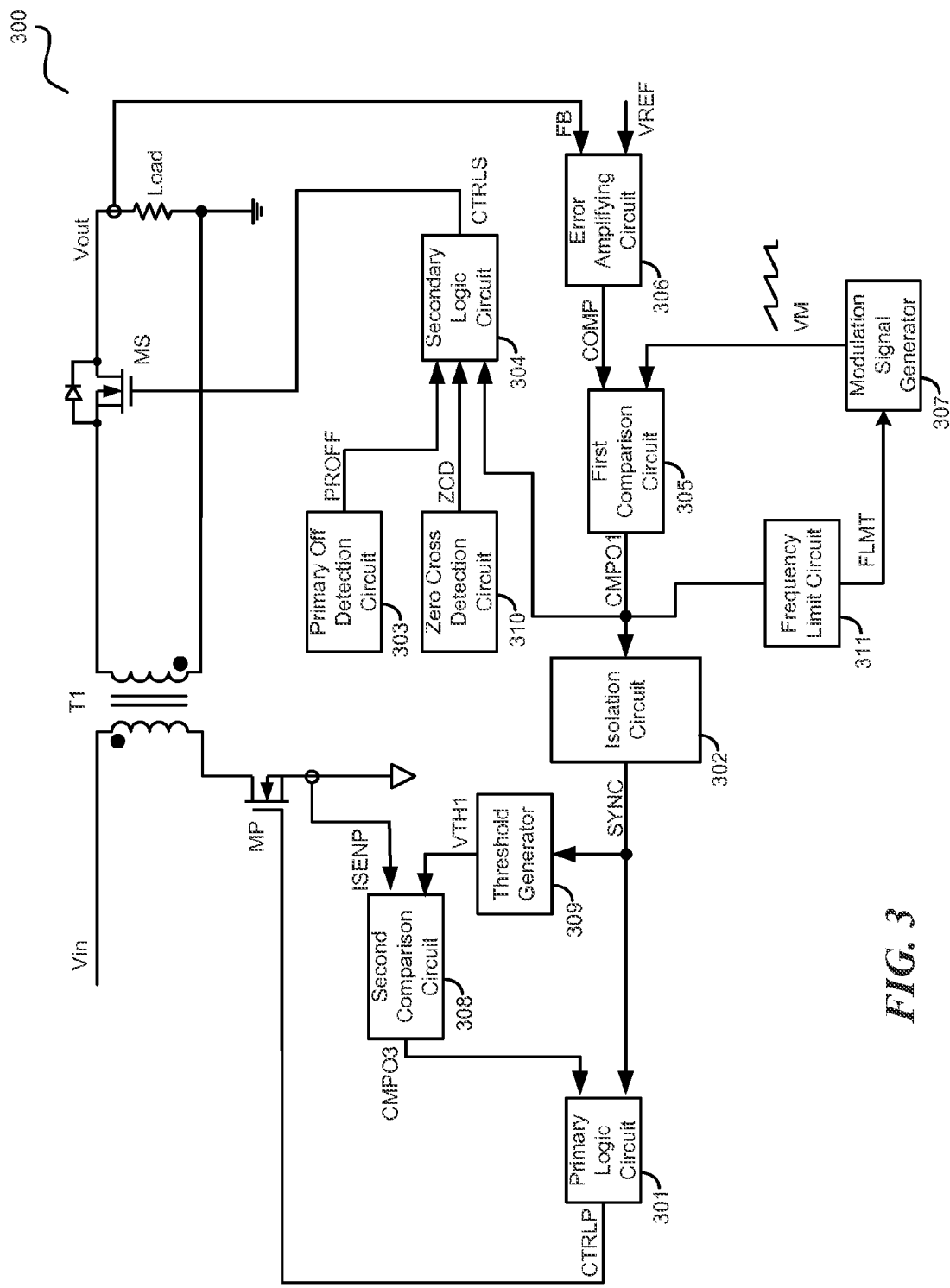
FIG. 3 illustrates a block diagram of an isolated switching converter 300 in accordance with an embodiment of the present invention.

FIG. 3 illustrates a block diagram of an isolated switching converter 300 in accordance with an embodiment of the present invention. Compared with the switching converter 200 shown in FIG. 2, the switching converter 300 further comprises a second comparison circuit 308. The second comparison circuit 308 has a first input terminal, a second input terminal and an output terminal, wherein the first input terminal is configured to receive a primary current sensing signal ISENP indicative of the current flowing through the primary switch MP, the second input terminal is configured to receive a first threshold voltage VTH1. The second comparison circuit 308 compares the primary current sensing signal ISENP with the first threshold voltage VTH1 and generates a second comparison signal CMPO2 at the output terminal. The primary logic circuit 301 is further coupled to the output terminal of the second comparison circuit 308, and configured to generate the primary control signal CTRLP based on the synchronous signal SYNC and the second comparison signal CMPO2.

The first threshold voltage VTH1 may be a constant value or a variable value varying with the synchronous signal SYNC. In an embodiment, the switching converter 300 further comprises a threshold generator 309. The threshold generator 309 has an input terminal and an output terminal, wherein the input terminal is coupled to the isolation circuit 302 to receive the synchronous signal SYNC, the output terminal is couple to the second input terminal of the second comparison circuit 308. Based on the synchronous signal SYNC, the threshold generator 309 generates the first threshold voltage VTH1 at the output terminal.

In some embodiments, to prevent a reverse current, the switching converter 300 further comprises a zero cross detection circuit 310. The zero cross detection circuit 310 is configured to detect whether the current flowing through the secondary switch MS crosses zero and generate a zero cross detection signal ZCD. The secondary logic circuit 304 is further coupled to the zero cross detection circuit 310 to receive the zero cross detection signal ZCD, and generates the secondary control signal CTRLS based on the first comparison signal CMPO1, the primary off detection signal PROFF and the zero cross detection signal ZCD. The secondary logic circuit 304 will turn off the secondary switch MS if a zero cross of the current flowing through the secondary switch MS is detected.

In some embodiments, a frequency limit circuit 311 is coupled between the output terminal of the first comparison circuit 305 and the modulation signal generator 307 to limit the switching frequency of the switching converter 300. The frequency limit circuit 311 has an input terminal and an output terminal, wherein the input terminal is coupled to the first comparison circuit 305 to receive the first comparison signal CMPO1, the output terminal is coupled to the modulation signal generator 307. Based on the first comparison signal CMPO1, the frequency limit circuit 311 generates a frequency limit signal FLMT at the output terminal to limit the frequency of the modulation signal VM.

Figure 4:
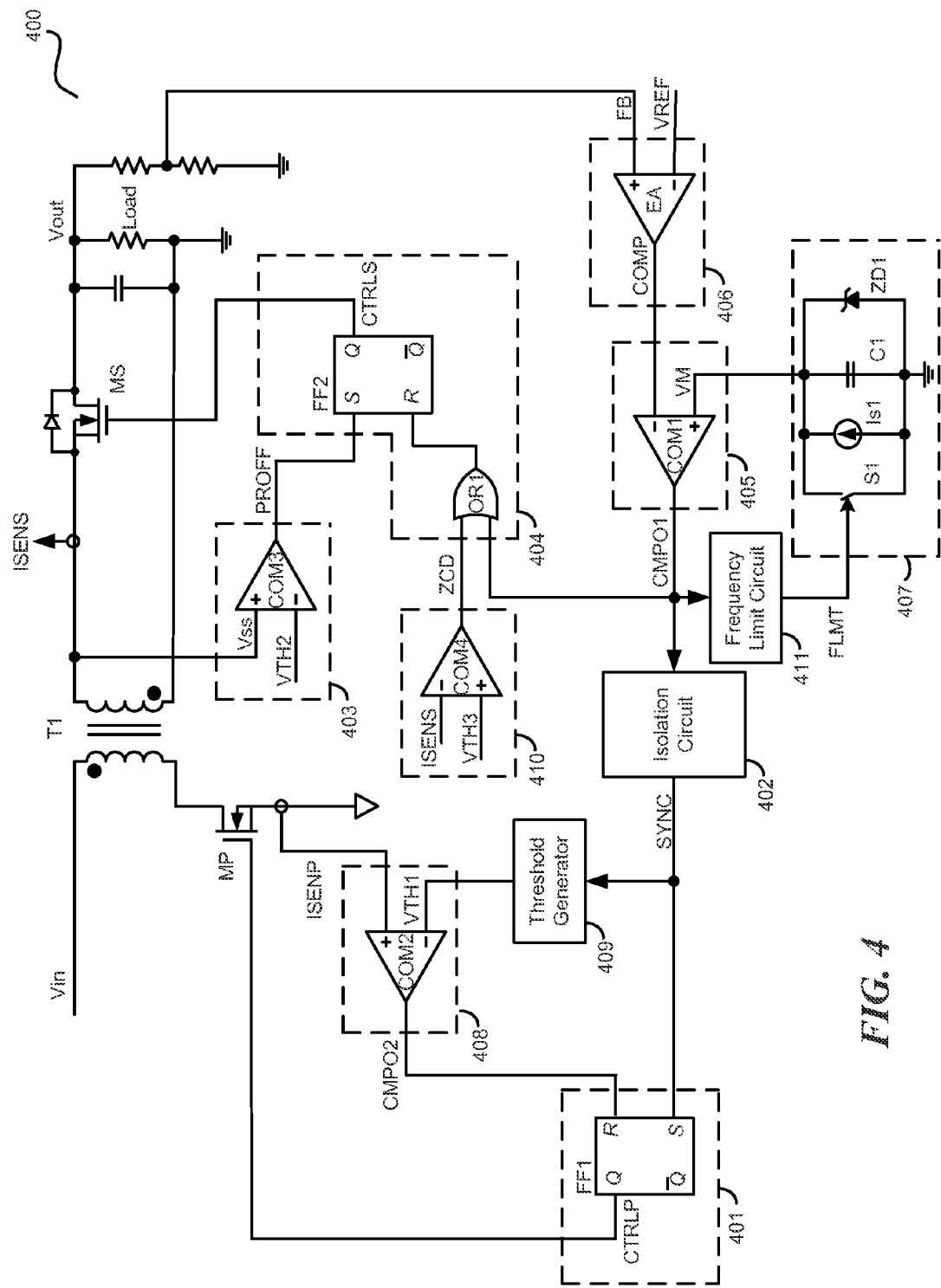
FIG. 4 schematically illustrates an isolated switching converter 400 in accordance with an embodiment of the present invention.

FIG. 4 schematically illustrates an isolated switching converter 400 in accordance with an embodiment of the present invention. As shown in the figure, the primary logic circuit 401 comprises a flip-flop FF1 having a set terminal, a reset terminal and an output terminal. The set terminal of the flip-flop FF1 is coupled to the output terminal of the isolation circuit 402 to receive the synchronous signal SYNC, the reset terminal is coupled to the output terminal of the second comparison circuit 408 to receive the second comparison signal CMPO2, the output terminal is coupled to the gate terminal of the primary switch MP to provide the primary control signal CTRLP. The second comparison circuit 408 comprises a comparator COM2. The non-inverting input terminal of the comparator COM2 is configured to receive the primary current sensing signal ISENP, the inverting input terminal is coupled to the threshold generator 409 to receive the first threshold voltage VTH1, the output terminal is coupled to the primary logic circuit 401 to provide the second comparison signal CMPO2.

The primary off detection circuit 403 comprises a comparator COM3. The non-inverting input terminal of the comparator COM3 is configured to receive the source voltage Vss of the secondary switch MS, the inverting input terminal is configured to receive a second threshold voltage VTH2, the output terminal is coupled to the secondary logic circuit 404 to provide the primary off detection signal PROFF. The zero cross detection circuit 410 comprises a comparator COM4. The non-inverting input terminal of the comparator COM4 is configured to receive a third threshold voltage VTH3, the inverting input terminal is configured to receive a secondary current sensing signal ISENS indicative of the current flowing through the secondary switch MS, the output terminal is coupled to the secondary logic circuit 404 to provide the zero cross detection signal ZCD.

The secondary logic circuit 404 comprises an OR gate OR1 and a flip-flop FF2. The OR gate has a first input terminal, a second input terminal and an output terminal, wherein the first input terminal is coupled to the zero cross detection circuit 410 to receive the zero cross detection signal ZCD, the second input terminal is coupled to the first comparison circuit 405 to receive the first comparison signal CMPO1. The flip-flop FF2 has a set terminal, a reset terminal and an output terminal, wherein the set terminal is coupled to the output terminal of the primary off detection circuit 403 to receive the primary off detection signal PROFF, the reset terminal is coupled to the output terminal of the OR gate OR1, the output terminal is coupled to the gate terminal of the secondary switch MS to provide the secondary control signal CTRLS.

The first comparison circuit 405 comprises a comparator COM1. The non-inverting input terminal of the comparator COM1 is coupled to the modulation signal generator 407 to receive the modulation signal VM, the inverting input terminal is coupled to the error amplifying circuit 406 to receive the compensation signal COMP, the output terminal is coupled to the isolation circuit 402 and the secondary logic circuit 404 to provide the first comparison circuit CMPO1.

The error amplifying circuit 406 comprises an error amplifier EA. The non-inverting input terminal of the error amplifier EA is configured to receive the feedback signal FB indicative of an output voltage Vout of the switching converter, the inverting input terminal is configured to receive the reference signal VREF, the output terminal is coupled to the first comparison circuit 405 to provide the compensation signal COMP.

The modulation signal generator 407 comprises a capacitor C1, a switch S1 and a current source Is1. The capacitor C1 has a first terminal and a second terminal, wherein the first terminal is coupled to the first comparison circuit 405 to provide the modulation signal VM, the second terminal is coupled to the secondary reference ground. The switch S1 has a first terminal, a second terminal and a control terminal, wherein the first terminal is coupled to the first terminal of the capacitor C1, the second terminal is coupled to the secondary reference ground, the control terminal is coupled to the output terminal of the first comparison circuit 405 through the frequency limit circuit 411. The current source Is1 has an input terminal and an output terminal, wherein the input terminal is coupled to the secondary reference ground, the output terminal is coupled to the first terminal of the capacitor C1. In one embodiment, the modulation signal generator 407 further comprises a Zener diode ZD1. The anode of the Zener diode ZD1 is coupled to the secondary reference ground, the cathode is coupled to the first terminal of the capacitor C1.

Figure 5:
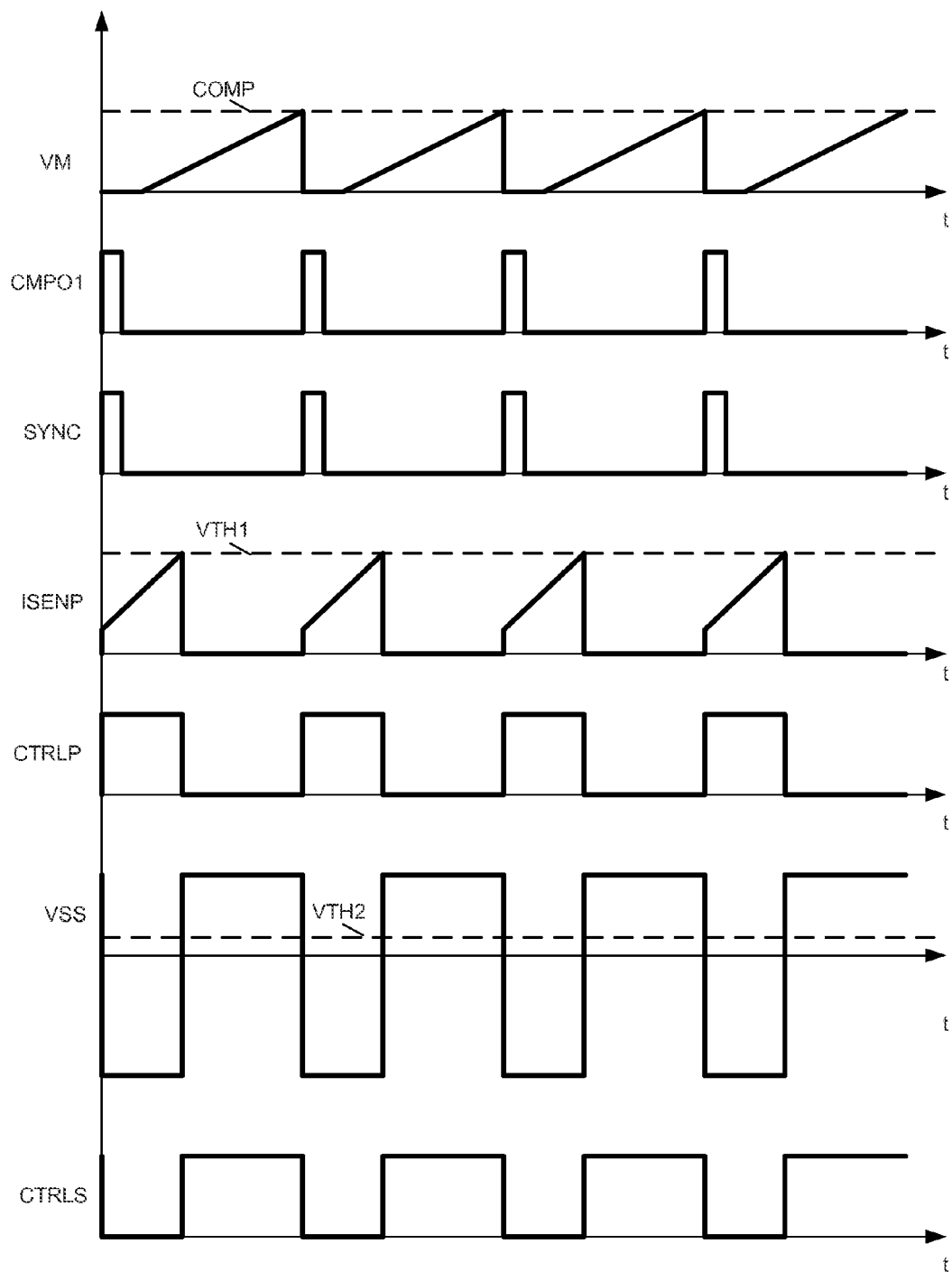
FIG. 5 illustrates waveforms of the isolated switching converter 400 in CCM mode in accordance with an embodiment of the present invention.

FIG. 5 illustrates waveforms of the isolated switching converter 400 in continuous current mode (CCM) in accordance with an embodiment of the present invention. As shown in FIG. 5, when the modulation signal VM increases to reach the compensation signal COMP, the first comparison signal CMPO1 is changed from logical low into logical high. The flip-flop FF2 is reset, the secondary control signal CTRLS is changed from logical high into logical low and the secondary switch MS is turned off. At almost the same time, the synchronous signal SYNC output by the isolation circuit 402 is also changed from logical low into logical high, the flip-flop FF1 is set. The primary control signal CTRLP is changed from logical low into logical high and the primary switch MP is turned on. The primary current sensing signal ISENP as well as the current flowing through the primary switch MP starts increasing. When the primary current sensing signal ISENP increases to reach the first threshold voltage VTH1, the flip-flop FF1 is reset. The primary control signal CTRLP is changed from logical high into logical low and the primary switch MP is turned off. After the primary switch MP being turned off, the source voltage Vss of the secondary switch MS is changed from negative into positive and becomes larger than the second threshold voltage VTH2. The flip-flop FF2 is set, the secondary control signal CTRLS is changed from logical low into logical high and the secondary switch MS is turned on.

Figure 6:
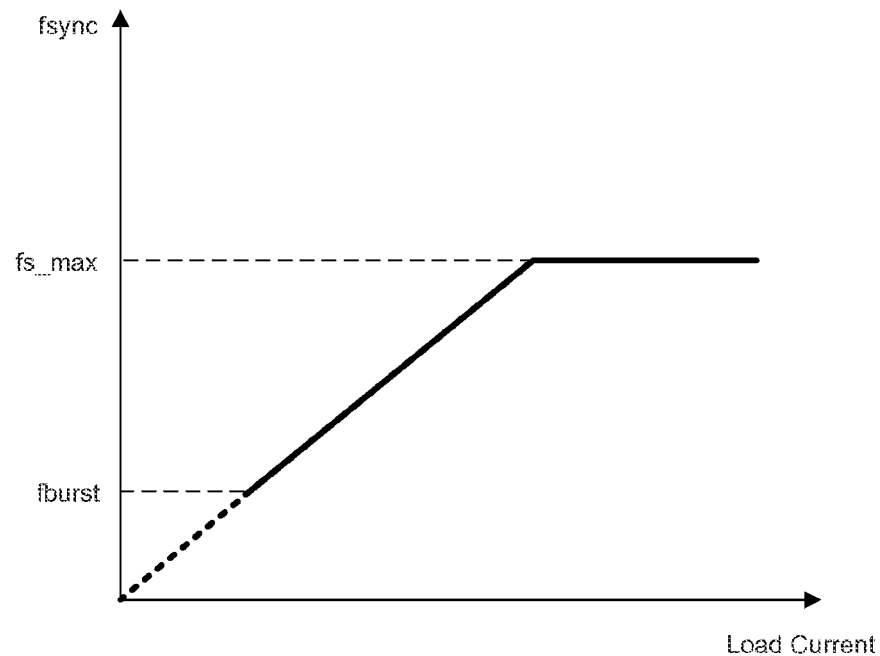
FIG. 6 schematically illustrates the relationship between the synchronous frequency fsync and the load current in the isolated switching converter 400 in accordance with an embodiment of the present invention.

FIG. 6 schematically illustrates the relationship between the frequency fsync of the synchronous signal SYNC and the load current in the isolated switching converter 400 in accordance with an embodiment of the present invention. When the load current increases, the compensation signal COMP as well as the feedback signal FB decreases. The time period during which the modulation signal VM increases to reach the compensation signal COMP decreases, which increases the frequency of the first comparison signal CMPO1 and also the synchronous frequency fsync. When the synchronous frequency fsync increases to reach a maximum frequency fs_max, it is limited to the maximum frequency fs_max by the frequency limit circuit 411 even if the load current keeps increasing.

When the load current decreases, the compensation signal COMP as well as the feedback signal FB increases. The time period during which the modulation signal VM increases to reach the compensation signal COMP increases, which decreases the frequency of the first comparison signal CMPO1 and also the synchronous frequency fsync. When the compensation signal COMP increases to reach the breakdown voltage of the Zener diode ZD1, the switching converter enters into a burst mode and the synchronous frequency fsync is equal to fburst. If the load current keeps decreasing, the modulation signal VM will be clamped to be equal to the breakdown voltage of the Zener diode ZD1 and cannot become larger than the compensation signal COMP. The first comparison signal CMPO1 and the synchronous signal SYNC are maintained low until the compensation signal COMP drops below the breakdown voltage of the Zener diode ZD1.

Figure 7:
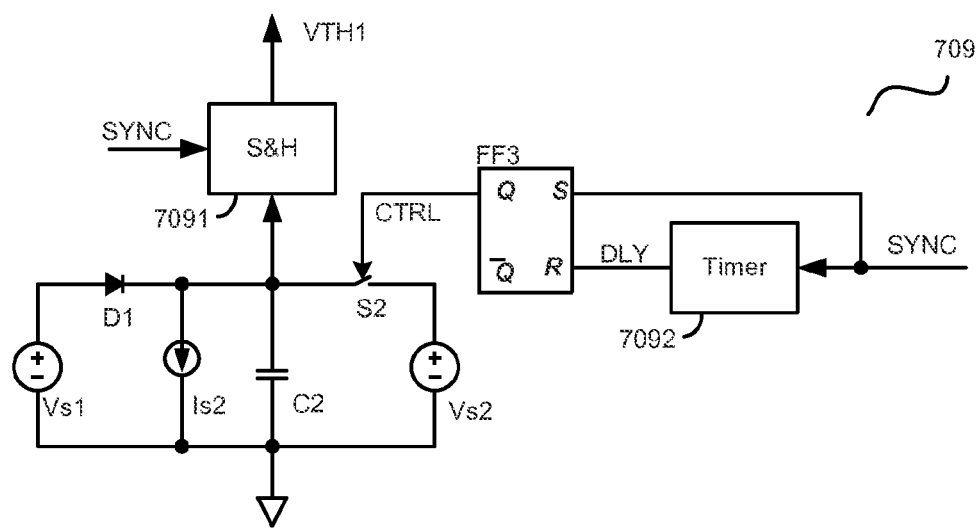
FIG. 7 schematically illustrates a threshold generator 709 in accordance with an embodiment of the present invention.

FIG. 7 schematically illustrates a threshold generator 709 in accordance with an embodiment of the present invention. The threshold generator 709 comprises a sample and hold circuit 7091, a timer 7092, a flip-flop FF3, a capacitor C2, a current source Is2, voltage source Vs1 and Vs2, a diode D1 and a switch S2. The timer 7092 has an input terminal and an output terminal, wherein the input terminal is coupled to the isolation circuit to receive the synchronous signal SYNC. The timer 7092 times based on the synchronous signal SYNC and generates a time signal DLY at the output terminal. The flip-flop FF3 has a set terminal, a reset terminal and an output terminal, wherein the set terminal is coupled to the isolation circuit to receive the synchronous signal SYNC, the reset terminal is coupled to the output terminal of the timer 7092 to receive the time signal DLY. Based on the synchronous signal SYNC and the time signal DLY, the flip-flop FF3 generates a switch control signal CTRL at the output terminal. The capacitor C2 has a first terminal and a second terminal, wherein the second terminal is coupled to the primary reference ground. The current source Is2 has an input terminal and an output terminal, wherein the input terminal is coupled to the first terminal of the capacitor C2, the output terminal is coupled to the primary reference ground. The voltage source Vs1 has a positive terminal and a negative terminal, wherein the negative terminal is coupled to the primary reference ground. The voltage source Vs2 has a positive terminal and a negative terminal, wherein the negative terminal is coupled to the primary reference ground. The diode D1 has an anode and a cathode, wherein the anode is coupled to the positive terminal of the voltage source Vs1, the cathode is coupled to the first terminal of the capacitor C2. The switch S2 has a first terminal, a second terminal and a control terminal, wherein the first terminal is coupled to the first terminal of the capacitor C2, the second terminal is coupled to the positive terminal of the voltage source Vs2, the control terminal is coupled to the output terminal of the flip-flop FF3 to receive the switch control signal CTRL. The sample and hold circuit 7091 has a first input terminal, a second input terminal and an output terminal, wherein the first input terminal is coupled to the isolation circuit to receive the synchronous signal SYNC, the second input terminal is coupled to the first terminal of the capacitor C2. Based on the synchronous signal SYNC (e.g. at the rising edge of the synchronous signal SYNC), the sample and hold circuit 7091 samples and holds the voltage across the capacitor C2 and generates the first threshold voltage VTH1 at the output terminal.

Figure 8:
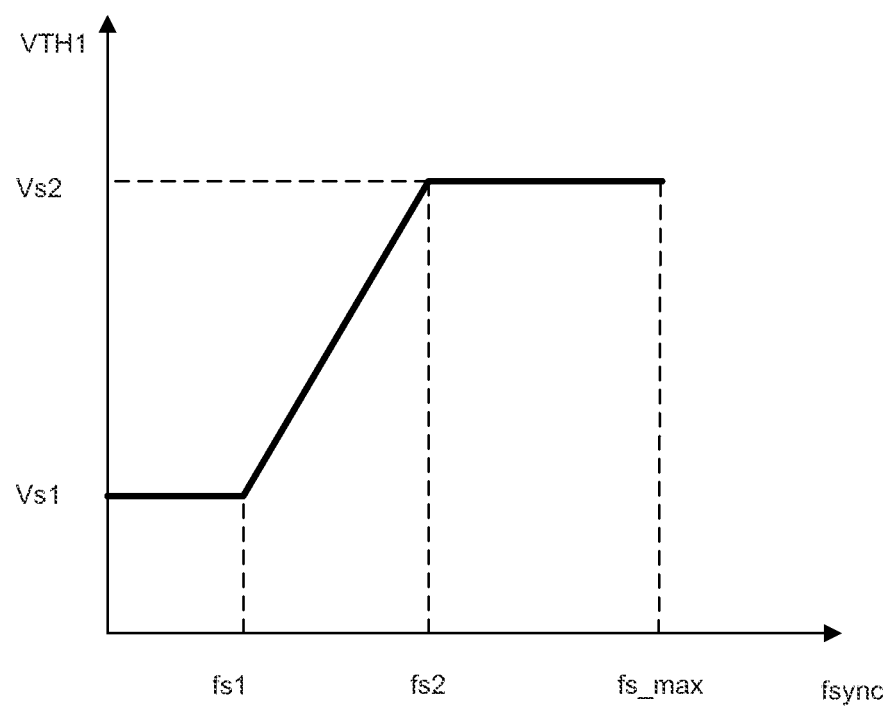
FIG. 8 schematically illustrates the relationship between the first threshold voltage VTH1 and the synchronous frequency fsync in the threshold generator 709 in accordance with an embodiment of the present invention.

FIG. 8 schematically illustrates the relationship between the first threshold voltage VTH1 and the synchronous frequency fsync in the threshold generator 709 in accordance with an embodiment of the present invention. As shown in FIG. 8, when the synchronous frequency fsync is larger than a second frequency threshold fs2, the period of the synchronous signal SYNC is shorter than a time threshold (1/fs2) of the timer 7092. When the synchronous signal SYNC changes from logical low into logical high, the timer 7092 is reset and starts timing again from zero. The flip-flop FF3 is set, the switch S2 is turned on and the voltage across the capacitor C2 is equal to the voltage provided by the voltage source Vs2. Since the period of the synchronous signal SYNC is shorter than the time threshold of the timer 7092, the flip-flop FF3 won't be reset. The switch S2 is maintained on and the voltage across the capacitor C2 won't change. The first threshold voltage VTH1 is equal to the voltage provided by the voltage source Vs2.

When the synchronous frequency fsync is smaller than the second frequency threshold fs2 but larger than a first frequency threshold fs1, the period of the synchronous signal SYNC is longer than the time threshold of the timer 7092. When the synchronous signal SYNC changes from logical low into logical high, the timer 7092 is reset. The flip-flop FF3 is set, the switch S2 is turned on and the voltage across the capacitor C2 is equal to the voltage provided by the voltage source Vs2. When the time threshold of the timer 7092 is reached, the flip-flop FF3 is reset. The switch S2 is turned off. The capacitor C2 is discharged by the current source Is2 and the voltage across the capacitor C2 decreases. The longer the period of the synchronous signal, the lower the voltage across the capacitor C2. That means, when the synchronous frequency fsync is smaller than the second frequency threshold fs2 but larger than the first frequency threshold fs1, the first threshold voltage VTH1 decreases along with the synchronous frequency fsync.

When the synchronous frequency fsync is smaller than the first frequency threshold fs1, the period of the synchronous signal SYNC is longer than the time threshold of the timer 7092. When the synchronous signal SYNC changes from logical low into logical high, the timer 7092 is reset. The flip-flop FF3 is set, the switch S2 is turned on and the voltage across the capacitor C2 is equal to the voltage provided by the voltage source Vs2. When the time threshold of the timer 7092 is reached, the flip-flop FF3 is reset. The switch S2 is turned off. The capacitor C2 is discharged by the current source Is2 and the voltage across the capacitor C2 decreases. When the voltage across the capacitor C2 decreases to be lower than the voltage of the voltage source Vs1, the diode D1 is turned on and the voltage across the capacitor C2 is clamped to be equal to the voltage provided by the voltage source Vs1. The first threshold voltage VTH1 is equal to the voltage provided by the voltage source Vs1.

Figure 9:
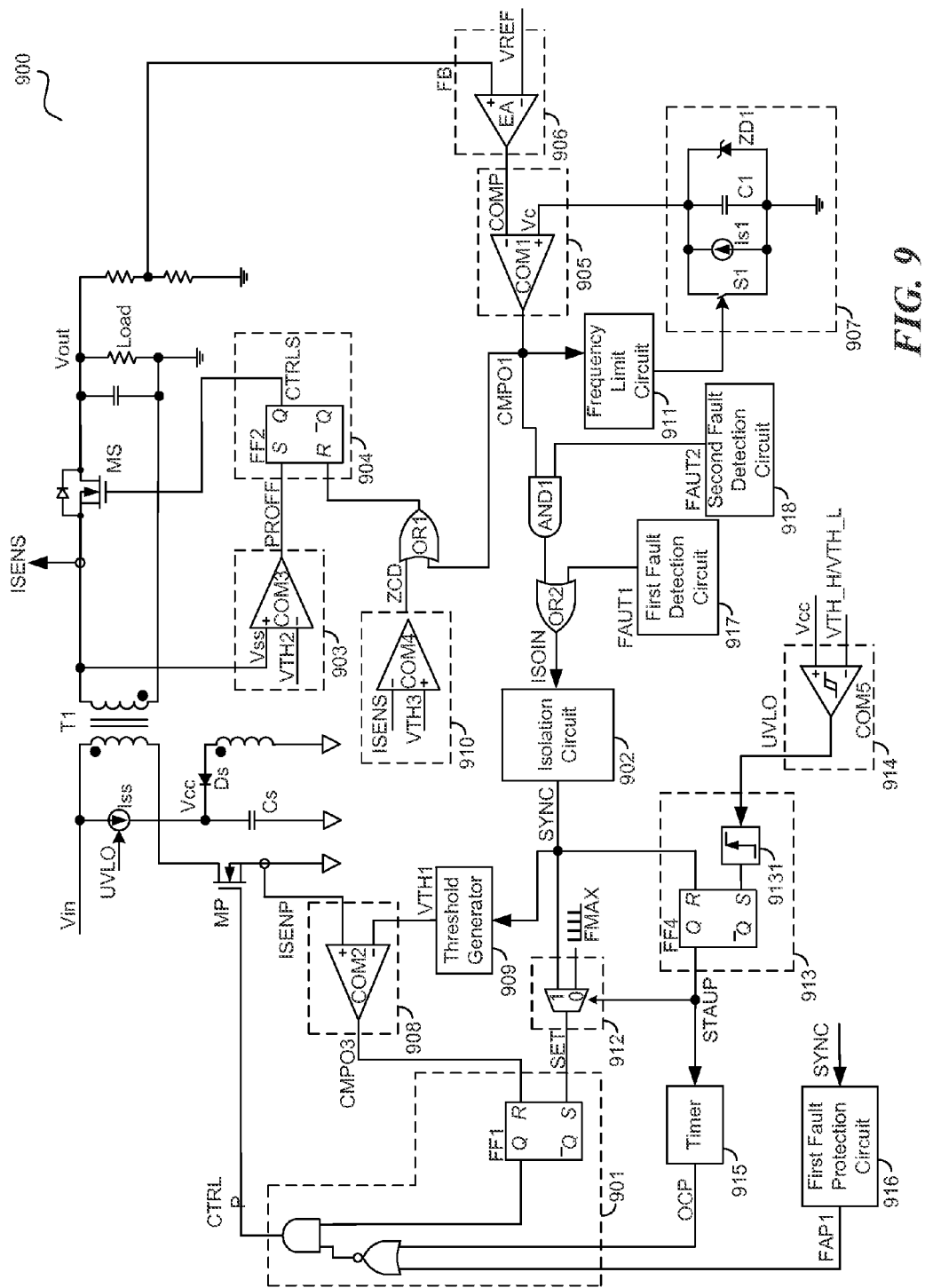
FIG. 9 schematically illustrates an isolated switching converter 900 in accordance with an embodiment of the present invention.

FIG. 9 schematically illustrates an isolated switching converter 900 in accordance with an embodiment of the present invention. Compared with the switching converter 400 shown in FIG. 4, the switching converter 900 further comprises a power supply diode Ds, a power supply capacitor Cs, a power supply current source Iss, a selection circuit 912, a startup circuit 913 and an under voltage lock out circuit 914. The transformer T1 further comprises an auxiliary winding. The power supply capacitor Cs has a first terminal and a second terminal, wherein the first terminal is configured to provide a power supply voltage Vcc, the second terminal is coupled to the primary reference ground. The power supply diode Ds has an anode and a cathode, wherein the anode is coupled to the auxiliary winding, the cathode is coupled to the first terminal of the power supply capacitor Cs. The under voltage lock out circuit 914 is coupled to the first terminal of the power supply capacitor Cs to receive the power supply voltage Vcc. The under voltage lock out circuit 914 compares the power supply voltage Vcc with a high threshold voltage VTH_H and a low threshold voltage VTH_L, and generates an under voltage lock out signal UVLO. The power supply current source Iss has an input terminal, an output terminal and a control terminal, wherein the input terminal is coupled to the primary winding of the transformer to receive the input voltage Vin, the output terminal is coupled to the first terminal of the power supply capacitor Cs, the control terminal is coupled to the under voltage lock circuit 914 to receive the under voltage lock out signal UVLO. The power supply current source Iss is turned off when the power supply voltage Vcc is higher than the high threshold voltage VTH_H, and turned on to charge the power supply capacitor Cs when the power supply voltage Vcc is lower than the low threshold voltage VTH_L. In some embodiments, when the power supply voltage Vcc is lower than the low threshold voltage VTH_L, primary side control circuits powered by the power supply voltage Vcc stop working to avoid misoperation.

The startup circuit 913 has a first input terminal, a second input terminal and an output terminal, wherein the first input terminal is coupled to the under voltage lock out circuit 914 to receive the under voltage lock out signal UVLO, the second input terminal is coupled to the isolation circuit 902 to receive the synchronous signal SYNC. Based on the under voltage lock out signal UVLO and the synchronous signal SYNC, the startup circuit 913 generates a startup signal STAUP at the output terminal. The selection circuit 912 has a first input terminal, a second input terminal, a control terminal and an output terminal, wherein the first input terminal is coupled to the isolation circuit 902 to receive the synchronous signal SYNC, the second input terminal is configured to receive a maximum frequency signal FMAX, the control terminal is coupled to the output terminal of the startup circuit 913 to receive the startup signal STAUP, the output terminal is coupled to the primary logic circuit 901. Based on the startup signal STAUP, the selection circuit 912 provides the synchronous signal SYNC or the maximum frequency signal FMAX to the output terminal as a set signal SET.

In the embodiment shown in FIG. 9, the under voltage lock out circuit comprises a hysteresis comparator COM5. The startup circuit 913 comprises a one-shot circuit 9131 and a flip-flop FF4. The one-shot circuit 9131 has an input terminal and an output terminal, wherein the input terminal is coupled to the under voltage lock out circuit 914 to receive the under voltage lock out signal UVLO. The flip-flop FF4 has a set terminal, a reset terminal and an output terminal, wherein the set terminal is coupled to the output terminal of the one-shot circuit 9131, the reset terminal is coupled to the isolation circuit 902 to receive the synchronous signal SYNC, the output terminal is coupled to the control terminal of the selection circuit 912 to provide the startup signal STAUP. The flip-flop FF4 is reset dominate.

In some embodiments, to stop working under fault condition, the switching converter 900 further comprises a timer 915. The timer 915 has an input terminal and an output terminal, wherein the input terminal is couple to the output terminal of the startup circuit 913 to receive the startup signal STAUP, the output terminal is coupled to the primary logic circuit 901. The timer 915 times based on the startup signal STAUP and generates an over current protection signal OCP at the output terminal. The primary switch MP will be turned off by the primary logic circuit 901 if a predetermined time threshold of the timer 915 is reached.

In some embodiments, the switching converter 900 further comprises a first fault protection circuit 916, a first fault detection circuit 917 and an OR gate OR2. The first fault detection circuit 917 is configured to detect whether the isolated switching converter works under fault condition (e.g. over voltage, over temperature etc.) and generate a first fault detection signal FAUT1. The OR gate OR2 has a first input terminal, a second input terminal and an output terminal, wherein the first input terminal is coupled to the first comparison circuit 905 to receive the first comparison signal CMPO1, the second input terminal is coupled to the first fault detection circuit 917 to receive the first fault detection signal FAUT1, the output terminal is coupled to the input terminal of the isolation circuit 902 to provide an isolation input signal ISOIN. The first fault protection circuit 916 has an input terminal and an output terminal, wherein the input terminal is coupled to the isolation circuit 902 to receive the synchronous signal SYNC, the output terminal is coupled to the primary logic circuit 901. Based on the synchronous signal SYNC, the first fault protection circuit 916 generates a first fault protection signal FAP1 at the output terminal. If the first fault detection circuit 917 detects the switching converter 900 works under fault condition, the first fault detection signal FAUT1 will be set to logical high. The isolation input signal ISOIN and the synchronous signal SYN will both become logical high because of the OR gate OR2. The primary switch MP will be turned off by the primary logic circuit 901 when the first fault protection circuit 916 detects that the synchronous signal SYNC is continuously high.

In other embodiments, the switching converter 900 may maintain the synchronous signal SYNC low to keep the primary switch MP off when detecting fault condition. This may be realized by an AND gate coupled to the input terminal of the isolation circuit 902.

The fault protection solutions mentioned above may also be combined. In the embodiment shown in FIG. 9, the switching converter 900 further comprises a second fault detection circuit 918 and an AND gate AND1. The second fault detection circuit 918 detects whether the switching converter works under fault condition (e.g. over load, over current etc.) and generate a second fault detection signal FAUT2. The AND gate AND1 has a first input terminal, a second input terminal and an output terminal, wherein the first input terminal is coupled to the first comparison circuit to receive the first comparison signal CMPO1, the second input terminal is coupled to the second fault detection circuit 918 to receive the second fault detection signal FAUT2, the output terminal is coupled to the first input terminal of the OR gate OR2.

Figure 10:
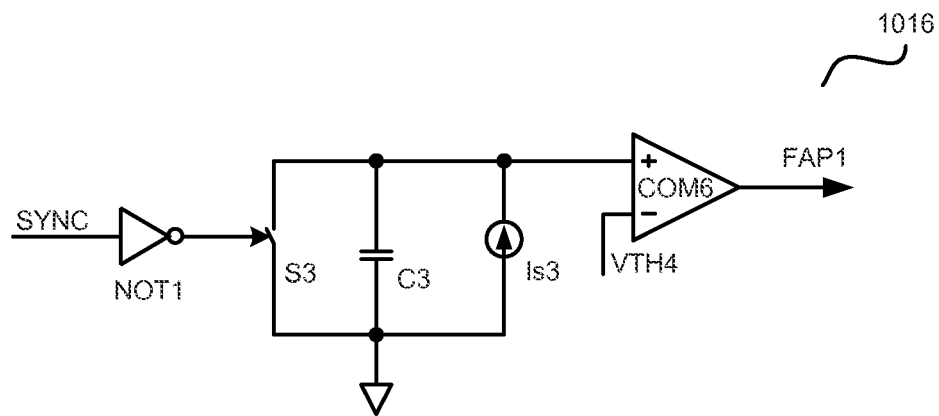
FIG. 10 schematically illustrates a first fault protection circuit 1016 in accordance with an embodiment of the present invention.

FIG. 10 schematically illustrates a first fault protection circuit 1016 in accordance with an embodiment of the present invention. The first fault protection circuit 1016 comprises a NOT gate NOT1, a switch S3, a capacitor C3, a current source Is3 and a comparator COM6. The NOT gate NOT1 has an input terminal and an output terminal, wherein the input terminal is configured to receive the synchronous signal SYNC. The capacitor C3 has a first terminal and a second terminal, wherein the second terminal is coupled to the primary reference ground. The switch S3 has a first terminal, a second terminal and a control terminal, wherein the first terminal is coupled to the first terminal of the capacitor C3, the second terminal is coupled to the primary reference ground, the control terminal is coupled to the output terminal of the NOT gate NOT1. The current source Is3 has an input terminal and an output terminal, wherein the input terminal is coupled to the primary reference ground, the output terminal is coupled to the first terminal of the capacitor C3. The non-inverting input terminal of the comparator COM6 is coupled to the first terminal of the capacitor C3, the inverting input terminal is configured to receive a fourth threshold voltage VTH4, the output terminal is configured to provide the first fault protection signal FAP1.

When the synchronous signal SYNC is logical high, the switch S3 is turned off. The capacitor C3 is charged by the current source Is3 and the voltage across the capacitor C3 gradually increases. When the synchronous signal SYNC is logical low, the switch S3 is turned on. The capacitor C3 is discharged and the voltage across the capacitor C3 quickly decreases. Under normal operation, the synchronous signal SYNC is a pulse signal. The voltage across the capacitor C3 is discharged to zero before reaching the fourth threshold voltage VTH4. The first fault protection signal FAP1 is maintained low. If the first fault detection circuit detects fault condition, the synchronous signal SYNC will be kept high. The voltage across the capacitor C3 will increase to reach the fourth threshold voltage VTH4, and the first fault protection signal FAP1 will be changed into logical high.

Figure 11:
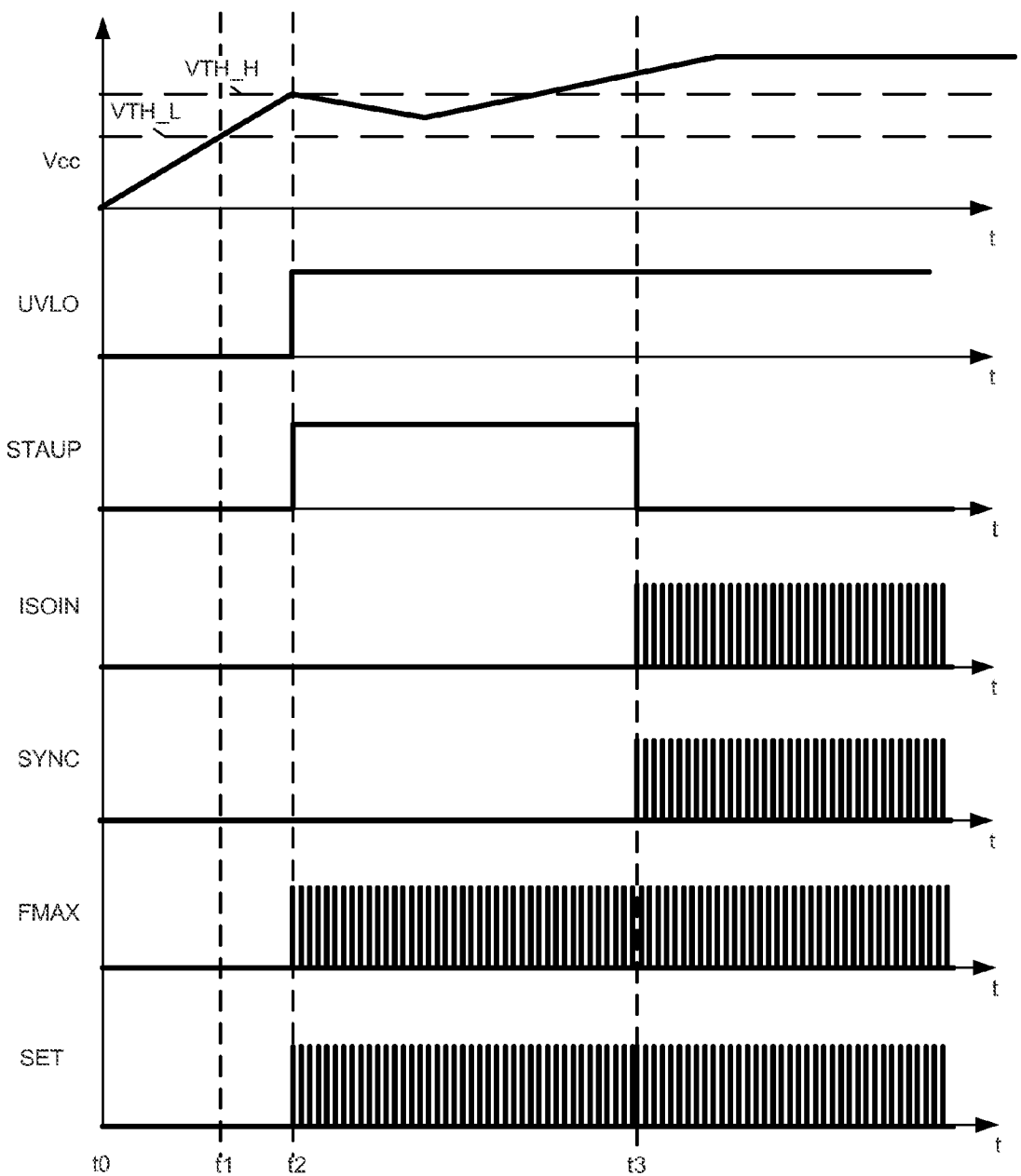
FIG. 11 illustrates waveforms of the isolated switching converter 900 during startup in accordance with an embodiment of the present invention.

FIG. 11 illustrates waveforms of the isolated switching converter 900 during startup in accordance with an embodiment of the present invention. At t0, the switching converter 900 is started. The power supply capacitor Cs is charged by the power supply current source Iss and the power supply voltage Vcc increases. Since the power supply voltage Vcc is insufficient then, the primary side control circuits cannot work. The maximum frequency signal FMAX has not been generated, the under voltage lock out signal UVLO is originally low. Since there is no energy transferred to the secondary side, the secondary side power supply voltage (e.g. the output voltage Vout) is also insufficient. The secondary side control circuits cannot work and the isolation input signal ISOIN has not been generated. The primary switch MP and the secondary switch MS are both off.

At t1, the power supply voltage Vcc increases to reach the low threshold voltage VTH_L, the under voltage lock out signal UVLO is maintained low.

At t2, the power supply voltage Vcc increases to reach the high threshold voltage VTH_H, the maximum frequency signal FMAX is generated. The under voltage lock out signal UVLO is changed from logical low into logical high. The power supply current source Iss is turned off and the auxiliary winding of the transformer T1 starts to provide energy to the power supply capacitor Cs. The flip-flop FF4 is set. The startup signal STAUP is changed from logical low into logical high, the set signal SET is equal to the maximum frequency signal FMAX. The primary switch MP starts switching to transfer energy to the load through the body diode of the secondary switch MS.

At t3, the secondary side control circuits start working, and the isolation input signal ISOIN is provided to the isolation circuit 902. The flip-flop FF4 is reset at the rising edge of the synchronous signal SYNC. The startup signal STAUP is changed from logical high into logical low, the set signal SET is equal to the synchronous signal SYNC. The switching converter 900 enters into normal operation.

Figure 12:
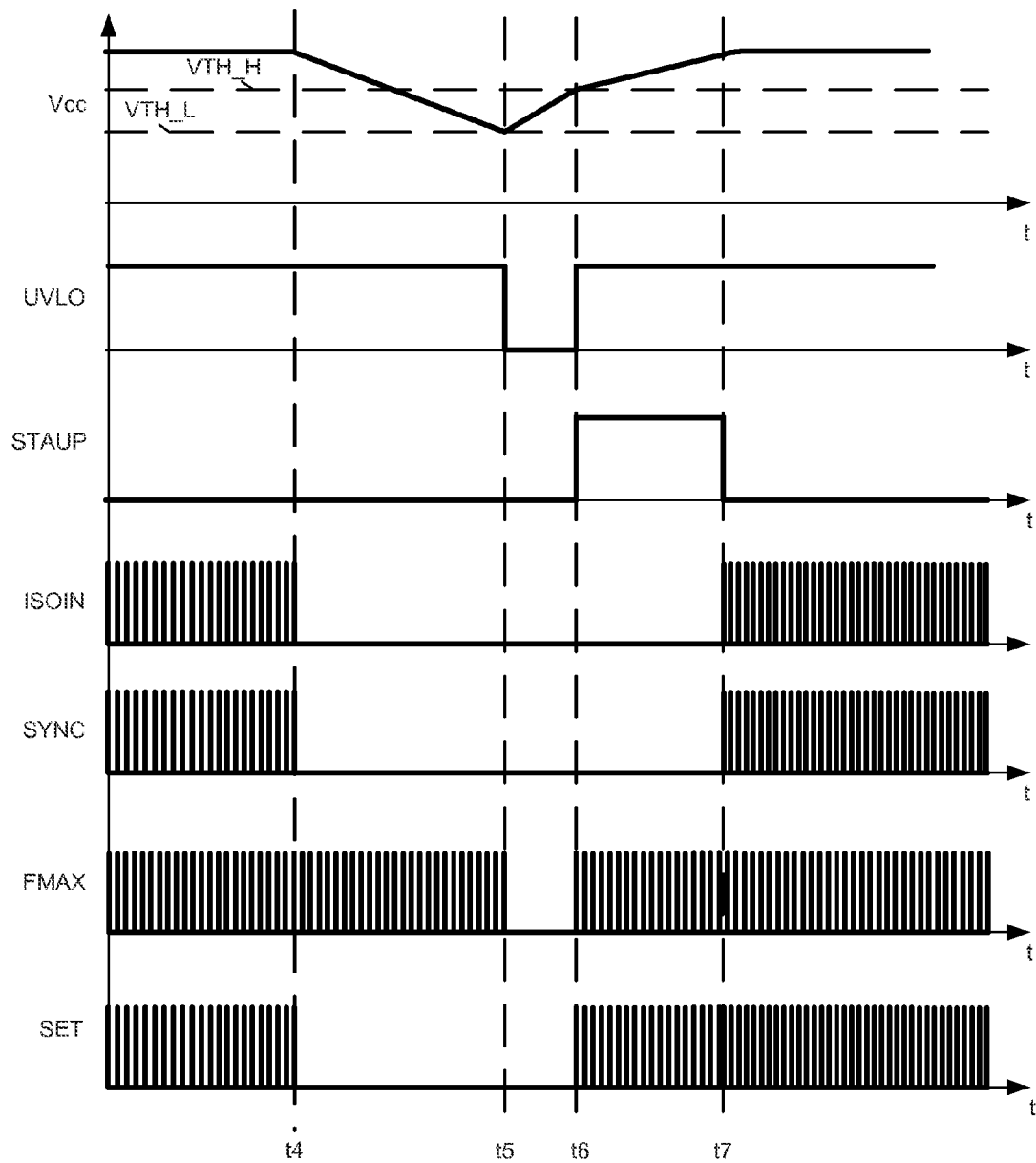
FIG. 12 illustrates waveforms of the isolated switching converter 900 during fault protection in accordance with an embodiment of the present invention.

FIG. 12 illustrates waveforms of the isolated switching converter 900 during fault protection in accordance with an embodiment of the present invention. At t4, the second fault detection circuit 918 detects fault condition and sets the isolation input signal ISOIN to be continuously low. The synchronous signal SYNC is also continuously low. The primary switch MP is maintained off and there is no energy transferred to the load. The auxiliary winding of the transformer T1 cannot provide sufficient energy to the power supply capacitor Cs, so the power supply voltage Vcc starts decreasing.

At t5, the power supply voltage Vcc decreases to reach the low threshold voltage VTH_L, the under voltage lock out signal UVLO is changed from logical high into logical low. The power supply current source Iss is turned on and the power supply voltage Vcc starts increasing.

At t6, the power supply voltage Vcc increases to reach the high threshold voltage VTH_H, the under voltage lock out signal UVLO is changed from logical low into logical high. The power supply current source Iss is turned off. The flip-flop FF4 is set. The startup signal STAUP is changed from logical low into logical high, the set signal SET is equal to the maximum frequency signal FMAX.

At t7, the second fault detection circuit 918 detects disappearance of the fault condition, the isolation input signal ISOIN is equal to the first comparison signal CMPO1. The flip-flop FF4 is reset at the rising edge of the synchronous signal SYNC. The startup signal STAUP is changed from logical high into logical low, the set signal SET is equal to the synchronous signal SYNC. The switching converter 900 resumes to normal operation.

Obviously many modifications and variations of the present invention are possible in light of the above teachings. It is therefore to be understood that within the scope of the appended claims the invention may be practiced otherwise than as specifically described. It should be understood, of course, that the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. A controller used in an isolated switching converter, wherein the isolated switching converter comprises a transformer having a primary winding and a secondary winding, a primary switch coupled to the primary winding and a secondary switch coupled to the secondary winding, the controller comprises:
   an error amplifying circuit configured to receive a reference signal and a feedback signal indicative of an output signal of the isolated switching converter, wherein based on the difference between the reference signal and the feedback signal, the error amplifying circuit generates a compensation signal;
   a modulation signal generator configured to generate a modulation signal;
   a first comparison circuit coupled to the error amplifying circuit and the modulation signal generator, wherein the first comparison circuit compares the compensation signal with the modulation signal and generates a first comparison signal;
   a primary off detection circuit configured to detect whether the primary switch is off and to generate a primary off detection signal;
   a secondary logic circuit coupled to the first comparison circuit and the primary off detection circuit, wherein based on the first comparison signal and the primary off detection signal, the secondary logic circuit generates a secondary control signal to control the secondary switch, and wherein the secondary logic circuit turns on the secondary switch when the primary off detection circuit detects the primary switch is off, and turns off the secondary switch when the compensation signal is smaller than the modulation signal;
   an isolation circuit coupled to the first comparison circuit to receive the first comparison signal, wherein based on the first comparison signal, the isolation circuit generates a synchronous signal electrically isolated from the first comparison signal;
   a second comparison circuit having a first input terminal, a second input terminal and an output terminal, wherein the first input terminal is configured to receive a primary current sensing signal indicative of the current flowing through the primary switch, the second input terminal is configured to receive a first threshold voltage, and wherein the second comparison circuit compares the primary current sensing signal with the first threshold voltage and generates a second comparison signal at the output terminal; and
   a primary logic circuit coupled to the isolation circuit and the second comparison circuit, wherein based on the synchronous signal and the second comparison signal, the primary logic circuit generates a primary control signal to control the primary switch, and wherein the primary logic circuit turns on the primary switch in accordance with the synchronous signal, and turns off the primary switch when the primary current sensing signal is larger than the first threshold voltage.

2. The controller of claim 1, further comprising:
a threshold generator having an input terminal and an output terminal, wherein the input terminal is coupled to the isolation circuit to receive the synchronous signal, the output terminal is couple to the second input terminal of the second comparison circuit, and wherein based on the synchronous signal, the threshold generator generates the first threshold voltage at the output terminal.

3. The controller of claim 2, wherein the threshold generator comprises:
   a timer having an input terminal and an output terminal, wherein the input terminal is coupled to the isolation circuit to receive the synchronous signal, and wherein based on the synchronous signal, the timer generates a time signal at the output terminal;
   a first flip-flop having a first input terminal, a second input terminal and an output terminal, wherein the first input terminal is coupled to the isolation circuit to receive the synchronous signal, the second input terminal is coupled to the output terminal of the timer to receive the time signal, and wherein based on the synchronous signal and the time signal, the first flip-flop generates a switch control signal at the output terminal;

a second capacitor having a first terminal and a second terminal, wherein the second terminal is coupled to a primary reference ground;

a second current source having an input terminal and an output terminal, wherein the input terminal is coupled to the first terminal of the second capacitor, the output terminal is coupled to the primary reference ground;

a first voltage source having a positive terminal and a negative terminal, wherein the negative terminal is coupled to the primary reference ground;

a second voltage source having a positive terminal and a negative terminal, wherein the negative terminal is coupled to the primary reference ground;

a first diode having an anode and a cathode, wherein the anode is coupled to the positive terminal of the first voltage source, the cathode is coupled to the first terminal of the second capacitor;

a second switch having a first terminal, a second terminal and a control terminal, wherein the first terminal is coupled to the first terminal of the second capacitor, the second terminal is coupled to the positive terminal of the second voltage source, the control terminal is coupled to the output terminal of the first flip-flop to receive the switch control signal; and a sample and hold circuit having a first input terminal, a second input terminal and an output terminal, wherein the first input terminal is coupled to the isolation circuit to receive the synchronous signal, the second input terminal is coupled to the first terminal of the second capacitor, and wherein based on the synchronous signal, the sample and hold circuit samples and holds the voltage across the second capacitor and generates the first threshold voltage at the output terminal.

4. The controller of claim 1, further comprising:
a frequency limit circuit having an input terminal and an output terminal, wherein the input terminal is coupled to the first comparison circuit to receive the first comparison signal, the output terminal is coupled to the modulation signal generator, and wherein based on the first comparison signal, the frequency limit circuit generates a frequency limit signal at the output terminal to limit the frequency of the modulation signal.

5. The controller of claim 1, wherein the primary off detection circuit comprises:
a third comparison circuit having a first input terminal, a second input terminal and an output terminal, wherein the first input terminal is coupled to the secondary switch to receive a source voltage of the secondary switch, the second input terminal is configured to receive a second threshold voltage, and wherein the third comparison circuit compares the source voltage of the secondary switch with the second threshold voltage and generates the primary off detection signal at the output terminal.

6. The controller of claim 1, wherein the modulation signal generator comprises:
a first capacitor having a first terminal and a second terminal, wherein the first terminal is coupled to the first comparison circuit to provide the modulation signal, the second terminal is coupled to a secondary reference ground;

a first switch having a first terminal, a second terminal and a control terminal, wherein the first terminal is coupled to the first terminal of the first capacitor, the second terminal is coupled to the secondary reference ground, the control terminal is coupled to the first comparison circuit to receive the first comparison signal; and a first current source having an input terminal and an output terminal, wherein the input terminal is coupled to the secondary reference ground, the output terminal is coupled to the first terminal of the first capacitor.

7. The controller of claim 6, wherein the modulation signal generator further comprises:
a Zener diode having an anode and a cathode, wherein the anode is coupled to the secondary reference ground, the cathode is coupled to the first terminal of the first capacitor.

8. The controller of claim 1, further comprising:
a first fault detection circuit configured to detect whether the isolated switching converter works under fault condition and generate a first fault detection signal;

an OR gate having a first input terminal, a second input terminal and an output terminal, wherein the first input terminal is coupled to the first comparison circuit to receive the first comparison signal, the second input terminal is coupled to the first fault detection circuit to receive the first fault detection signal, the output terminal is coupled to the isolation circuit to provide an isolation input signal; and a first fault protection circuit having an input terminal and an output terminal, wherein the input terminal is coupled to the isolation circuit to receive the synchronous signal, the output terminal is coupled to the primary logic circuit, and wherein based on the synchronous signal, the first fault protection circuit generates a first fault protection signal at the output terminal.

9. The controller of claim 1, further comprising:
an under voltage lock out circuit configured to receive a power supply voltage, wherein the under voltage lock out circuit compares the power supply voltage with a high threshold voltage and a low threshold voltage, and generates an under voltage lock out signal;

a startup circuit having a first input terminal, a second input terminal and an output terminal, wherein the first input terminal is coupled to the under voltage lock out circuit to receive the under voltage lock out signal, the second input terminal is coupled to the isolation circuit to receive the synchronous signal, and wherein based on the under voltage lock out signal and the synchronous signal, the startup circuit generates a startup signal at the output terminal; and a selection circuit having a first input terminal, a second input terminal, a control terminal and an output terminal, wherein the first input terminal is coupled to the isolation circuit to receive the synchronous signal, the second input terminal is configured to receive a maximum frequency signal, the control terminal is coupled to the output terminal of the startup circuit to receive the startup signal, the output terminal is couple to the primary logic circuit, and wherein based on the startup signal, the selection circuit provides the synchronous signal or the maximum frequency signal to the output terminal as a set signal.

10. The controller of claim 9, wherein the startup circuit comprises:
a one-shot circuit having an input terminal and an output terminal, wherein the input terminal is coupled to the under voltage lock out circuit to receive the under voltage lock out signal; and a second flip-flop having a first input terminal, a second input terminal and an output terminal, wherein the first input terminal is coupled to the output terminal of the one-shot circuit, the second input terminal is coupled to the isolation circuit to receive the synchronous signal, the output terminal is coupled to the control terminal of the selection circuit to provide the startup signal.

11. An isolated switching converter, comprising:
a transformer having a primary winding and a secondary winding, wherein the secondary winding is coupled to provide an output signal to a load;
a primary switch coupled between the primary winding and a primary reference ground;
a secondary switch coupled between the secondary winding and the load;
an error amplifying circuit configured to receive a reference signal and a feedback signal indicative of the output signal, wherein based on the difference between the reference signal ad the feedback signal, the error amplifying circuit generates a compensation signal;
a modulation signal generator configured to generate a modulation signal;
a first comparison circuit coupled to the error amplifying circuit and the modulation signal generator, wherein the first comparison circuit compares the compensation signal with the modulation signal and generates a first comparison signal;
a primary off detection circuit configured to detect whether the primary switch is off and to generate a primary off detection signal;
a zero cross detection circuit configured to detect whether the current flowing the secondary switch crosses zero and generate a zero cross detection signal;
a secondary logic circuit coupled to the first comparison circuit, the primary off detection circuit and the zero cross detection circuit, wherein based on the first comparison signal, the primary off detection signal and the zero cross detection signal, the secondary logic circuit generates a secondary control signal to control the secondary switch, and wherein the secondary logic circuit turns on the secondary switch when the primary off detection circuit detects the primary switch is off, and turns off the secondary switch when the compensation signal is smaller than the modulation signal or a zero cross of the current flowing through the secondary switch is detected;
an isolation circuit coupled to the first comparison circuit to receive the first comparison signal, wherein based on the first comparison signal, the isolation circuit generates a synchronous signal electrically isolated from the first comparison signal;
a threshold generator coupled to the isolation circuit to receive the synchronous signal, wherein based on the synchronous signal, the threshold generator generates a first threshold voltage;
a second comparison circuit coupled to the threshold generator, wherein the second comparison circuit compares a primary current sensing signal indicative of the current flowing through the primary switch with the first threshold voltage and generates a second comparison signal; and
a primary logic circuit coupled to the isolation circuit and the second comparison circuit, wherein based on the synchronous signal and the second comparison signal, the primary logic circuit generates a primary control signal to control the primary switch, and wherein the primary logic circuit turns on the primary switch in accordance with the synchronous signal, and turns off the primary switch when the primary current sensing signal is larger than the first threshold voltage.

12. The isolated switching converter of claim 11, further comprising:
a first fault detection circuit configured to detect whether the isolated switching converter works under fault condition and generate a first fault detection signal;
an OR gate having a first input terminal, a second input terminal and an output terminal, wherein the first input terminal is coupled to the first comparison circuit to receive the first comparison signal, the second input terminal is coupled to the first fault detection circuit to receive the first fault detection signal, the output terminal is coupled to the isolation circuit to provide an isolation input signal; and
a first fault protection circuit having an input terminal and an output terminal, wherein the input terminal is coupled to the isolation circuit to receive the synchronous signal, the output terminal is coupled to the primary logic circuit, and wherein based on the synchronous signal, the first fault protection circuit generates a first fault protection signal at the output terminal.

13. The isolated switching converter of claim 11, wherein the transformer further comprises an auxiliary winding, and wherein the isolated switching converter further comprises:
a power supply capacitor having a first terminal and a second terminal, wherein the first terminal is configured to provide a power supply voltage, the second terminal is coupled to the primary reference ground;
a power supply diode having an anode and a cathode, wherein the anode is coupled to the auxiliary winding, the cathode is coupled to the first terminal of the power supply capacitor;
an under voltage lock out circuit coupled to the first terminal of the power supply capacitor, wherein the under voltage lock out circuit compares the power supply voltage with a high threshold voltage and a low threshold voltage, and generates an under voltage lock out signal;
a power supply current source having an input terminal, an output terminal and a control terminal, wherein the input terminal is coupled to the primary winding of the transformer, the output terminal is coupled to the first terminal of the power supply capacitor, the control terminal is coupled to the under voltage lock circuit to receive the under voltage lock out signal;
a startup circuit having a first input terminal, a second input terminal and an output terminal, wherein the first input terminal is coupled to the under voltage lock out circuit to receive the under voltage lock out signal, the second input terminal is coupled to the isolation circuit to receive the synchronous signal, and wherein based on the under voltage lock out signal and the synchronous signal, the startup circuit generates a startup signal at the output terminal; and
a selection circuit having a first input terminal, a second input terminal, a control terminal and an output terminal, wherein the first input terminal is coupled to the isolation circuit to receive the synchronous signal, the second input terminal is configured to receive a maximum frequency signal, the control terminal is coupled to the output terminal of the startup circuit to receive the startup signal, the output terminal is couple to the primary logic circuit, and wherein based on the startup signal, the selection circuit provides the synchronous signal or the maximum frequency signal to the output terminal as a set signal.

14. A control method of an isolated switching converter, wherein the isolated switching converter comprises a transformer having a primary winding and a secondary winding, a primary switch coupled to the primary winding and a secondary switch coupled to the secondary winding, the control method comprises:
- sensing an output signal of the isolated switching converter and generating a feedback signal;
- generating a compensation signal based on the difference between the reference signal and the feedback signal;
- comparing the compensation signal with a modulation signal and generating a first comparison signal;
- detecting whether the primary switch is off and generating a primary off detection signal;
- generating a secondary control signal to control the secondary switch based on the first comparison signal and the primary off detection signal, wherein the secondary switch is turned on when the primary switch is off, and turned off when the compensation signal is smaller than the modulation signal;
- generating a synchronous signal electrically isolated from the first comparison signal;
- sensing the current flowing through the primary switch and generating a primary current sensing signal;
- comparing the primary current sensing signal with a first threshold voltage and generating a second comparison signal; and
- generating a primary control signal to control the primary switch based on the synchronous signal and the second comparison signal, wherein the primary switch is turned on in accordance with the synchronous signal, and turned off when the primary current sensing signal is larger than the first threshold voltage.

15. The control method of claim 14, further comprising:
generating the first threshold voltage based on the synchronous signal.

16. The control method of claim 14, further comprising:
detecting whether the current flowing through the secondary switch crosses zero; and
turning off the secondary switch if the current flowing through the secondary switch crosses zero.

17. The control method of claim 14, wherein the step of generating the primary control signal comprises:
- comparing a power supply voltage with a high threshold voltage and a low threshold voltage, and generating an under voltage lock out signal;
- generating a startup signal based on the under voltage lock out signal and the synchronous signal;
- selecting the synchronous signal or a maximum frequency signal as a set signal based on the startup signal; and
- generating the primary control signal based on the set signal.

18. The control method of claim 17, further comprising:
- timing based on the startup signal and generating a time value; and
- turning off the primary switch if the time value exceeds a predetermined time threshold.

* * * * *